(12) United States Patent
Wang et al.

(10) Patent No.: US 9,965,288 B2
(45) Date of Patent: May 8, 2018

(54) PRECONFIGURING HARDWARE AND SPEEDING UP SERVER DISCOVERY PRIOR TO BIOS BOOT

(71) Applicant: Cisco Technology, Inc., San Jose, CA (US)

(72) Inventors: Tao Wang, Cupertino, CA (US); Scott Phuong, Sunnyvale, CA (US); Lihfang Shen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 313 days.

(21) Appl. No.: 14/328,116

(22) Filed: Jul. 10, 2014

(65) Prior Publication Data

US 2016/0011879 A1    Jan. 14, 2016

(51) Int. Cl.
*G06F 9/44* (2018.01)

(52) U.S. Cl.
CPC .................................. *G06F 9/4401* (2013.01)

(58) Field of Classification Search
CPC ................................................... G06F 9/4401
See application file for complete search history.

(56) References Cited

U.S. PATENT DOCUMENTS

| 5,787,246 A | * | 7/1998 | Lichtman | G06F 15/177 |
| | | | | 709/220 |
| 6,230,265 B1 | * | 5/2001 | Ahrens | G06F 1/26 |
| | | | | 713/1 |
| 6,336,185 B1 | * | 1/2002 | Sargenti, Jr. | G06F 9/4405 |
| | | | | 713/1 |
| 6,438,688 B1 | * | 8/2002 | Nunn | G06F 8/65 |
| | | | | 709/220 |
| 6,487,713 B1 | | 11/2002 | Cohen et al. | |
| 6,510,512 B1 | * | 1/2003 | Alexander | G06F 9/44521 |
| | | | | 713/2 |
| 6,931,646 B2 | | 8/2005 | Dubal | |
| 6,996,705 B2 | | 2/2006 | Cheston et al. | |
| 7,484,084 B1 | * | 1/2009 | Ranaweera | G06F 8/67 |
| | | | | 713/1 |
| 7,895,376 B2 | * | 2/2011 | Boecker | G06F 13/423 |
| | | | | 710/104 |
| 7,975,084 B1 | * | 7/2011 | Kalbarga | G06F 13/102 |
| | | | | 710/104 |
| 8,024,556 B1 | * | 9/2011 | Cook | G06F 8/67 |
| | | | | 707/822 |
| 2003/0055919 A1 | * | 3/2003 | Fong | H04L 29/06 |
| | | | | 709/220 |
| 2003/0226004 A1 | * | 12/2003 | Abbondanzio | G06F 15/177 |
| | | | | 713/1 |

(Continued)

FOREIGN PATENT DOCUMENTS

CN             103455350 A      12/2013

*Primary Examiner* — Vincent Tran
*Assistant Examiner* — Gary Collins
(74) *Attorney, Agent, or Firm* — Edell, Shapiro & Finnan, LLC

(57) ABSTRACT

Techniques are provided for preconfiguring hardware prior to BIOS boot up, and in particular, accessing a Basic Input Output System (BIOS) feature descriptor in the BIOS read only memory area, the BIOS feature descriptor comprising information associated with a BIOS of the server; and utilizing the BIOS feature descriptor, prior to boot up operations of the server, to configure hardware of the server.

17 Claims, 7 Drawing Sheets

(56) References Cited

U.S. PATENT DOCUMENTS

| | | | | |
|---|---|---|---|---|
| 2004/0006689 A1* | 1/2004 | Miller | | G06F 8/63 |
| | | | | 713/1 |
| 2004/0215948 A1* | 10/2004 | Abbey | | G06F 9/5077 |
| | | | | 713/1 |
| 2005/0081024 A1* | 4/2005 | Khatri | | G06F 8/65 |
| | | | | 713/100 |
| 2005/0289288 A1* | 12/2005 | Matheny | | H03M 7/30 |
| | | | | 711/102 |
| 2006/0026415 A1* | 2/2006 | Chen | | G06F 8/65 |
| | | | | 713/2 |
| 2006/0116208 A1* | 6/2006 | Chen | | G06F 9/541 |
| | | | | 463/43 |
| 2007/0079094 A1* | 4/2007 | Wang | | G06F 9/4401 |
| | | | | 711/163 |
| 2007/0088941 A1* | 4/2007 | Henning | | G06F 9/4411 |
| | | | | 713/1 |
| 2007/0294520 A1* | 12/2007 | Leigh | | G06F 9/4411 |
| | | | | 713/1 |
| 2008/0046706 A1* | 2/2008 | Hirai | | G06F 11/2294 |
| | | | | 713/1 |
| 2009/0157941 A1* | 6/2009 | Bolan | | H04L 41/0886 |
| | | | | 711/6 |
| 2010/0037044 A1* | 2/2010 | Yang | | G06F 9/4401 |
| | | | | 713/100 |
| 2010/0082783 A1* | 4/2010 | Kohn | | G06F 9/4416 |
| | | | | 709/222 |
| 2010/0082965 A1* | 4/2010 | Tsuji | | G06F 9/4401 |
| | | | | 713/2 |
| 2010/0111309 A1* | 5/2010 | Khatri | | G06F 21/602 |
| | | | | 380/283 |
| 2010/0169629 A1* | 7/2010 | Zhang | | G06F 9/44505 |
| | | | | 713/1 |
| 2010/0262815 A1* | 10/2010 | Bozek | | G06F 9/4416 |
| | | | | 713/1 |
| 2012/0221839 A1* | 8/2012 | Chen | | G06F 8/65 |
| | | | | 713/1 |
| 2012/0239918 A1* | 9/2012 | Huang | | G06F 9/4401 |
| | | | | 713/2 |
| 2013/0007428 A1* | 1/2013 | Khosrowpour | | G06Q 10/063 |
| | | | | 713/1 |
| 2013/0138933 A1 | 5/2013 | Wang | | |
| 2014/0250292 A1* | 9/2014 | Edwards | | G06F 9/4401 |
| | | | | 713/2 |
| 2015/0149754 A1* | 5/2015 | Hu | | G06F 11/2284 |
| | | | | 713/2 |

* cited by examiner

PRECONFIGURING HARDWARE AND SPEEDING UP SERVER DISCOVERY PRIOR TO BIOS BOOT

TECHNICAL FIELD

The present disclosure relates to preconfiguring hardware and speeding up server discovery prior to boot up operations.

BACKGROUND

A data center server, often equipped with more than 1 terabyte of memory, may spend a lengthy amount of time in boot up procedures including executing Basic Input Output System (BIOS) code. The BIOS is typically stored in Read Only Memory (ROM) and may also be referred to as ROM BIOS. In general, the BIOS refers to software that determines computer instructions required to control the keyboard, display screen, disk drives, external communications, and a number of other miscellaneous functions.

A power on self test (POST), a series of diagnostic tests performed during boot up procedures, may test for proper functioning of various components of the system, including random access memory, disk drives, hard drives, central processing units, and other hardware devices. POST is generally initiated and controlled by the BIOS during boot up procedures.

A baseboard management controller (BMC), usually implemented on the motherboard or main circuit board of a server, may monitor the physical state of a computer or hardware device and communicate with an administrative device. For example, the BMC may measure internal physical variables such as temperature, humidity, power-supply voltage, fan speeds, communications parameters and operating system (OS) functions, and may communicate parameter variations to the administrative device. The BMC may also be utilized by the administrative device for remote configuration of the server.

DESCRIPTION OF EXAMPLE EMBODIMENTS

Overview

Techniques are provided for preconfiguring hardware prior to boot up of a server, and in particular, accessing a BIOS feature descriptor in memory, the BIOS feature descriptor comprising information associated with the BIOS of the server; and utilizing the BIOS feature descriptor, prior to boot up of the server to configure the server.

Example Embodiments

Speed of server discovery during BIOS boot up is an important aspect of server management. A server may spend up to 10 minutes or more to boot up and finish POST. During this time period, the server management software typically remains unaware of the features and capabilities of the server BIOS until the boot up completes and information from the BIOS is passed to the server management software. Accordingly, the server management software cannot perform optimization or pre-configure the server hardware prior to BIOS boot, and thus, server discovery performance is impacted by the lengthy boot-up delay.

According to the techniques presented herein, a BIOS feature descriptor file, separate from but associated with the server BIOS, may be used to preconfigure server hardware prior to boot up. Upon inserting a server into a chassis (i.e., upon initial power up), a Baseboard Management Controller (BMC) may scan the BIOS feature descriptor file stored in BIOS read only memory (ROM). The BMC may then relay relevant data contained in the BIOS feature descriptor file to the server management software. Accordingly, the server management software can proceed to preconfigure hardware before full BIOS boot up.

Figure 1:
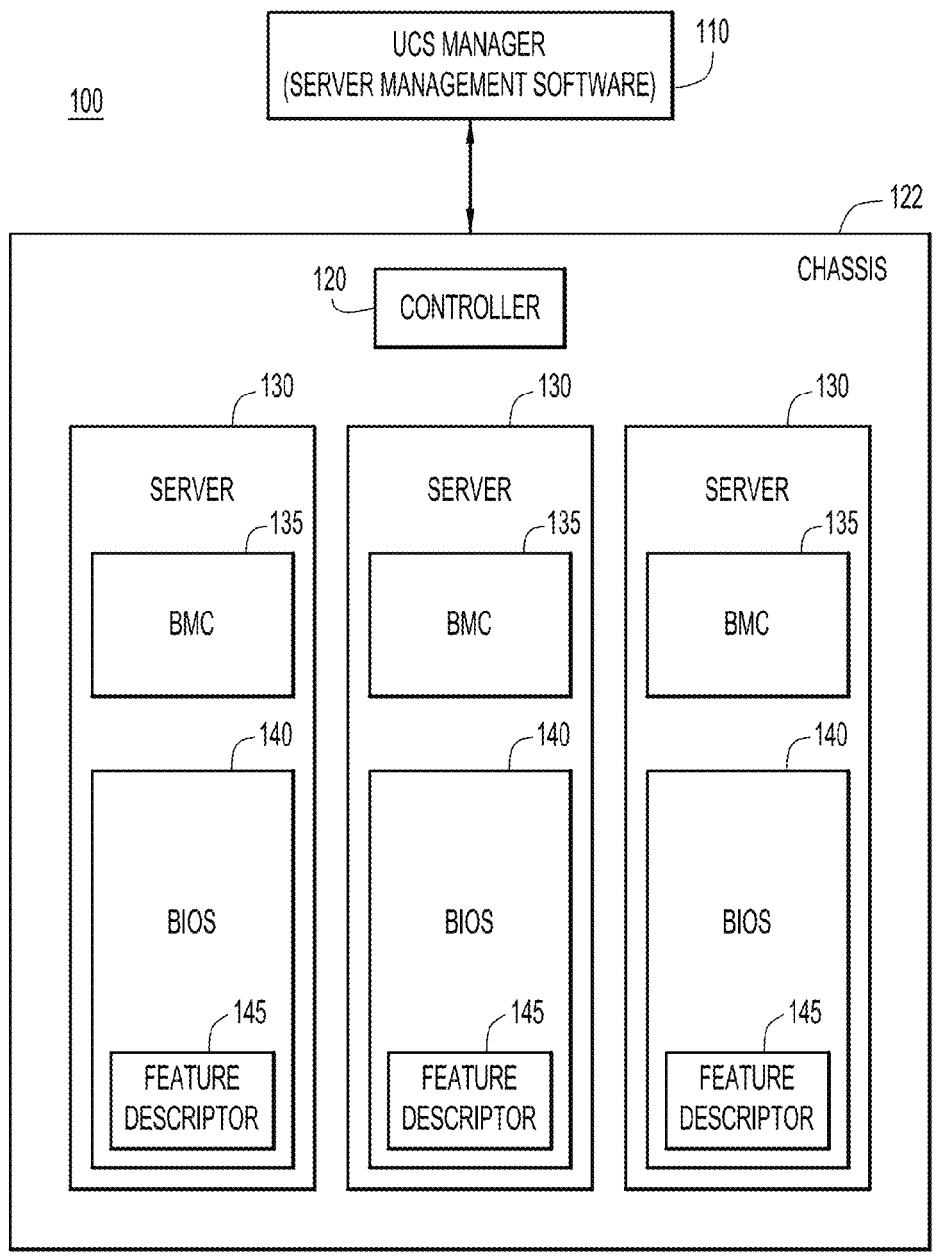
FIG. 1 is a block diagram of an example computing system, showing various components for preconfiguring hardware prior to boot up, according to the techniques disclosed herein.

FIG. 1 is a block diagram of a system 100 capable of preconfiguring server hardware prior to boot up procedures. System 100 may comprise server management software, e.g., Unified Computing System Manager 110, a controller 120 for a chassis 122, and a plurality of host servers 130. Host server 130 comprises a BMC 135, a BIOS 140, and a BIOS feature descriptor 145, which may be stored in memory of a given server 130. Those skilled in the art will appreciate that these entities may be stored at any memory location accessible by the server. Each of these components will be described in additional detail below.

UCS Manager 110 may manage and deploy configuration information to servers 130 within a single chassis (or within multiple chassis), as well as receive configuration information from servers 130 as part of discovery and profiling processes used to determine the features and capabilities of a server. For example, UCS Manager 110 may receive configuration information pertaining to BIOS capabilities and features for each server as well as specify parameters and other configuration information for a particular server and communicate such information to the appropriate server.

In another embodiment, BMC 135 (via a service processor) may access information, e.g., parameters that may be configured, using the BIOS feature descriptor 145. It is understood that a service processor, as disclosed herein, may execute BMC logic to perform the functions associated with BMC 135. The BMC may provide this information to the UCS Manager 110, where the information is presented to a user. The user may select desired configurations, with the selected information provided back to the BMC 135 for (host) server configuration. Either the BMC 135 or the BIOS 140 or both may perform hardware configuration of the server.

In yet another embodiment, configuration of hardware may be directed by the UCS Manager 110. Selected parameters related to specific hardware configuration may be specified by the user in a service profile, and the UCS Manager 110 may translate and communicate the service profile comprising the configuration information to the BMC 135.

Chassis 122 may house a plurality of servers, providing a power supply to each device, and in some cases, facilitating communication between server 130 and UCS Manager 110. Chassis 122 may also have a chassis controller 120, which governs distribution of power and other parameters, as needed. In some approaches, BMC 135 may communicate with UCS Manager 110, directly or through controller 120.

Baseboard management controller (BMC) 135 may monitor the physical state of a computer or hardware device and may communicate with an administrative device, e.g., UCS Manager Server 110. For example, the BMC may measure internal physical variables and may communicate measurements of such physical variables to the administrative device. The BMC may also be utilized by the UCS Manager Server 110 for remote configuration of the server 130.

The BIOS 140 manages the components and functionality of a computing device, and is involved in conducting a series of diagnostic tests known as POST during boot up. POST may test for proper functioning of various components of the system, including random access memory, disk drives, hard drives, central processing units, and other hardware devices. POST is generally initiated and controlled by the BIOS during boot up.

A feature descriptor file 145 may comprise parameters associated with the BIOS, including BIOS build options, static BIOS information, driver stack version contained in BIOS, and Original Equipment Manufacturer (OEM) BIOS feature versions (e.g., power capping, precision boot order control table versions, etc.), and may be stored as a predetermined data structure. In one embodiment, the feature descriptor may be stored in flash memory in uncompressed ASCII format. During boot up, the BMC may access the contents of the feature descriptor file, identify and extract information relevant to how the BIOS is configured, and send one or more components of this information to UCS Manager Server 110, in order to speed up the boot up process.

Specifically, BMC 135 (via a service processor) may access the corresponding feature descriptor file 145, to provide BIOS configuration information to UCS Manager 110. For example, BMC 135 may scan the BIOS feature descriptor 145 prior to BIOS boot up, preconfigure server hardware, relay BIOS feature knowledge to UCS Manager 110 to facilitate server discovery and associated processes and have better fault management. The BMC 135, by accessing BIOS feature descriptor file 145, is able to configure the server hardware for communication with the UCS Manager 110. Since the BMC 135 is aware of the capabilities of the BIOS, due to the information in the feature descriptor file 145, the BMC 135 is able to communicate this information to UCS Manager 110. Accordingly, boot up information can be provided to the UCS Manager 110 from the BMC 135 before BIOS 140 completes boot up and POST completes. In other embodiments, BIOS feature knowledge may be provided to the UCS Manager 110 by BMC 135, and an administrator or user may provide input for server configuration based upon the provided information.

BMC 135 may provide bootup information to UCS Manager 110, indicating whether the BIOS 140 includes certain features, and whether specific alerts may be utilized. For example, prior to BIOS bootup, the BMC 135 (via a service processor) can extract BIOS version information from the BIOS feature descriptor 145 to indicate to the UCS Manager 110 whether the BIOS 140 supports a particular feature, e.g., a particular architecture for a microprocessor such as an ivy bridge (IVB) CPU. If the motherboard is equipped with this architecture, then the UCS Manager 110 can generate a fault to alert the user when a new BIOS update is needed.

Another example of an aspect that may be configured includes managing power on a server. In some cases, power consumption of a system may vary or change. By providing information regarding power requirements to the UCS Manager 110, the UCS Manager 110 can determine whether the current specified or allocated power is too high or too low. In some cases, the power consumption of a particular server may have decreased, and thus, a lower power supply may be warranted. By accessing the BIOS feature descriptor 145, the BMC 135 may provide this information to the UCS Manager 110 early in the bootup process.

Additionally, the BIOS feature descriptor 145 may contain information regarding a precision boot order feature, e.g., a level 2 boot order (also known as a $2^{nd}$ level boot order). For example, while level 1 boot order is generally considered to be categories of boot devices (e.g., hard drive, CD ROM, etc.), level 2 boot order may specify which device in a category of devices to boot from (e.g., which CD drive from a plurality of CD drives, which memory from a plurality of hard drives, etc.) If this feature is supported, UCS Manager 110 may activate the precision boot order table feature.

As another example, the feature descriptor 145 may also contain information about whether a particular firmware package was successfully installed and validated.

Without feature descriptor 145, it may be necessary to obtain such information via a lengthy discovery boot process, and one or more reboots might be needed to properly activate or deactivate features. Utilization of the feature descriptor file helps minimize or even eliminate reboot events.

Thus, by learning BIOS features in the feature descriptor file 145 prior to actual BIOS 140 boot up and completion, the BMC 135 becomes aware of the features and capabilities of the server BIOS 140. The BMC 135 is then able to pre-configure server hardware for the BIOS 140 and relay information to UCS Manager 110 to facilitate server discovery and associated processes, improving server discovery performance by reducing BIOS 140 boot up time.

Another advantage of the techniques disclosed herein is that rebooting events may be minimized or eliminated. For example, in the absence of the BIOS feature descriptor 145, a server would be powered on and would progress through a discovery process to determine available features for hardware configuration. Selecting new or different features may involve a reboot process. The techniques presented herein eliminate the need for such a reboot process. By having information regarding BIOS features, e.g., in BIOS feature descriptor 145, provided to UCS Manager 110 at an earlier stage, desired features may be selected and configured earlier, thus, avoiding the need for proceeding through a time consuming reboot process.

Figure 2:
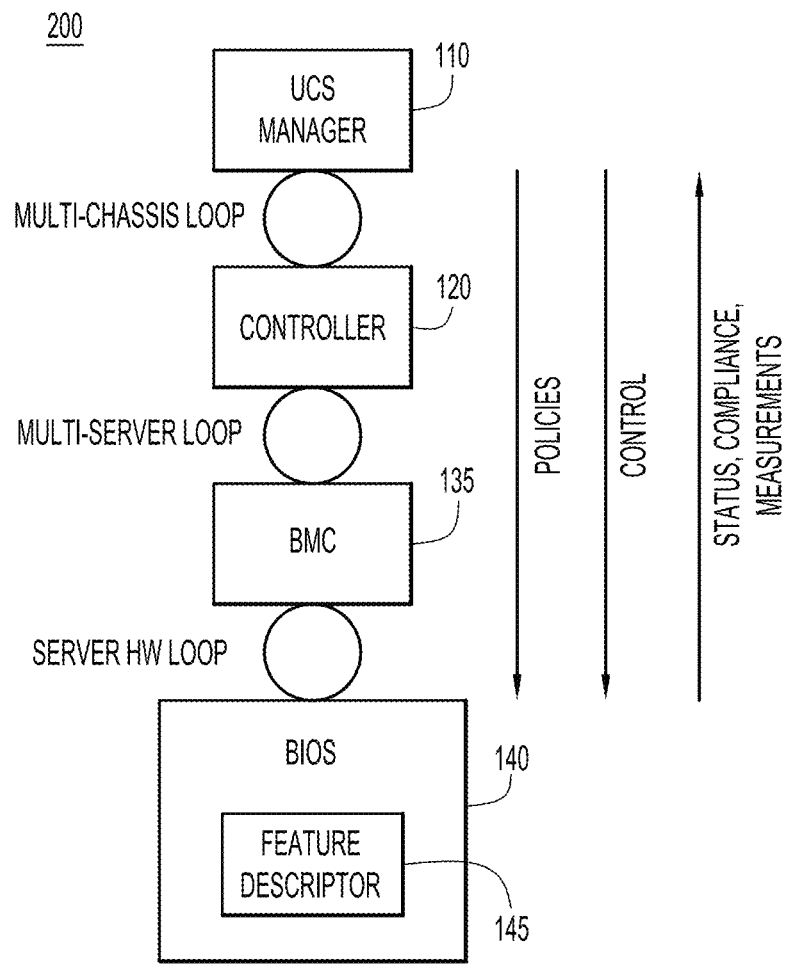
FIG. 2 is an illustration showing an example software architecture for preconfiguring hardware prior to boot up, according to the techniques disclosed herein.

FIG. 2 illustrates an example diagram of software architecture 200 for system 100. UCS Manager 110 may communicate with controller 120. Controller 120, also referred to as the chassis controller, may communicate with BMC 135. BMC 135 may communicate with BIOS 140 and access feature descriptor 145. In other approaches, BMC 135 may communicate directly with UCS Manager 110.

As seen from this figure, policies and control decisions are generally performed at the administrative level, e.g., by UCS Manager 110, and distributed downward through controller 120 to individual servers in a chassis. Similarly, information regarding the status, compliance, as well as measurements regarding various states and performance characteristics of a server may be sent from a server to UCS Manager 110.

Figure 3A:
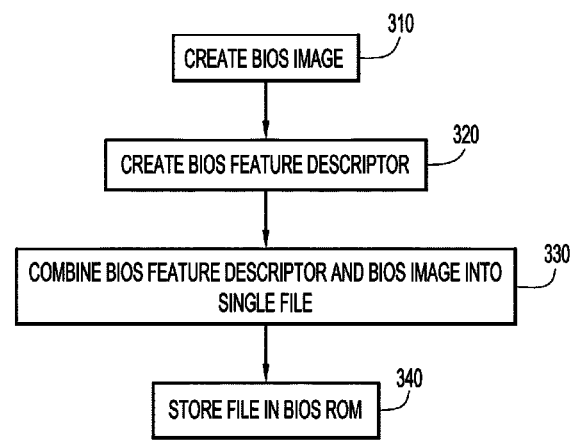
FIG. 3A is a flow chart depicting an example BIOS build process, according to the techniques disclosed herein.

FIG. 3A shows an example flow chart for a BIOS build process. At operation 310, a BIOS image is created. At operation 320, a BIOS feature descriptor is created comprising various BIOS parameters, which may be associated with a data structure. The BIOS feature descriptor may contain information regarding BIOS functionality for a particular BIOS build.

At operation 330, the BIOS feature descriptor is combined with the BIOS image into a single file. Accordingly, the combined file contains information regarding the features and capabilities of the BIOS as well as information from the BIOS build itself. At 340, the feature descriptor is stored in BIOS ROM.

The combined file comprises a BIOS image as well as the feature descriptor, which includes features and capabilities of the BIOS in uncompressed format (e.g., in a predetermined data structure). Features may not always be stored at the same location within a file, as file size may depend on a particular BIOS image build. Therefore, an anchor string may be included within the combined file. The BMC may search for the anchor string in order to identify a start memory location of the feature descriptor 145 and thus identify relevant information from the feature descriptor to send to the UCS Manager 110.

Figure 3B:
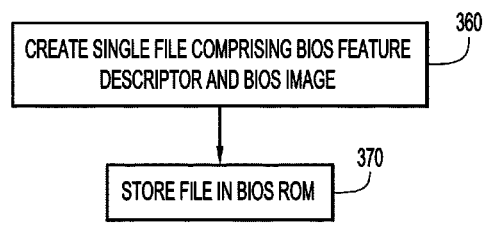
FIG. 3B is a flow chart depicting another example BIOS build process, according to the techniques disclosed herein.

FIG. 3B shows another example of a BIOS build process. At operation 360, a file is created comprising a BIOS feature descriptor and a BIOS image. In this example, the feature descriptor may be created along with the main BIOS image during the BIOS build process, rather than as a separate process. At operation 370, the feature descriptor is stored in BIOS ROM.

Figure 3C:
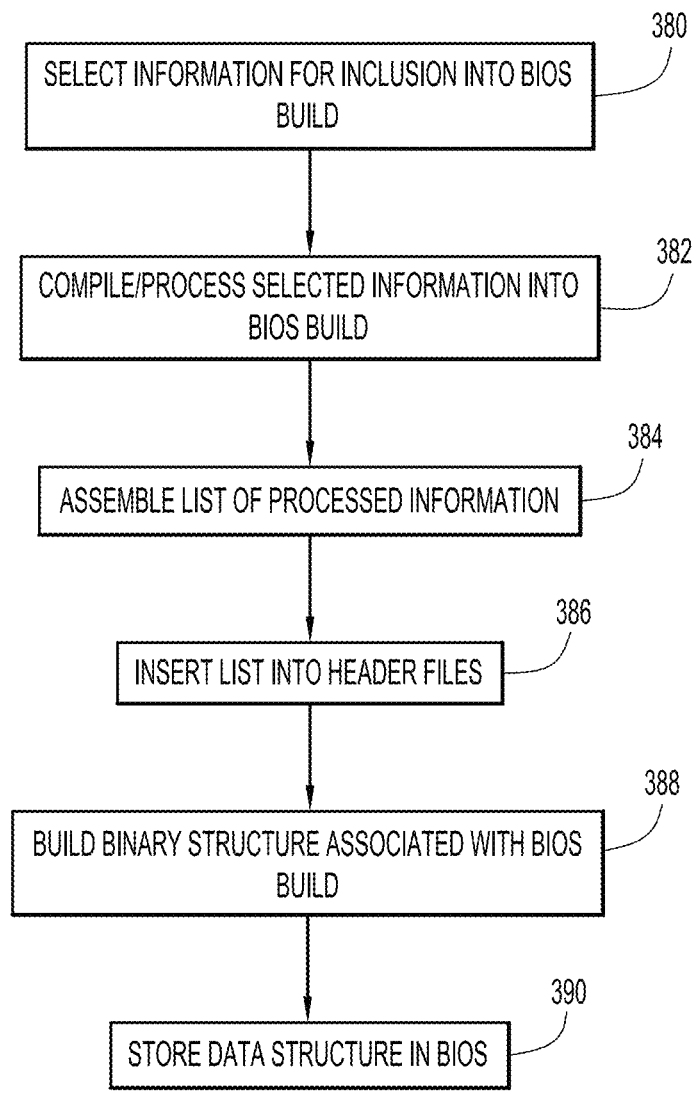
FIG. 3C is a flow chart depicting generation of a BIOS feature descriptor file, according to the techniques disclosed herein.

Referring to FIG. 3C, an example of generating a feature descriptor file 145 in additional detail is provided herein. As discussed previously, a feature descriptor file is a file comprising a description of the features and functions of the BIOS, and is based on a build of the BIOS. In this example, a BIOS build process is described first, followed by a process for generating a feature descriptor file based upon the BIOS build.

In a BIOS build process, a source code configuration file may designate information to be built into a BIOS image. For example, BIOS build processes may utilize information, including a list of configurations, variables, definitions, switches, or the like, as shown at 380, to indicate to a compiler which portions of source code or function procedures are to be included or overwritten in a final BIOS image. These defined switch values are usually included in the header files (e.g., *.h,*.equ,*.inc, etc.) or act as build flags during build processes. For example, a typical BIOS configuration file may contain a list of definitions corresponding to various configurations.

These configuration files may be processed to produce source code files such as "configuration.h", "configuration.equ", etc., which will become part of the source code tree and are built into the BIOS image using an appropriate source code compilation tool, as shown at 382. Any suitable tool with the ability to compile source code may be utilized in conjunction with the techniques provided herein.

To build a BIOS feature descriptor 145, information including processed variable values, which are included within a BIOS build, are collected and assembled into a single file or list, as shown as 384. An example of collected processed variable files are provided below:

| #define | REMOVE_UEFI_BOOT_OPTION | 0 |
| #define | CiscoSecBoot_ENABLE | 1 |
| #define | SHOW_SECURITY_FORMSET | 0 |
| #define | DEFAULT_PROVISION_SECURE_VARS | 1 |
| #define | DEFAULT_SECURE_BOOT_ENABLE | 0 |
| #define | INSTALL_DUMMY_SECURITY_PROTOCOL | 0 |
| #define | SET_LIFETIME_PPLOCK | 1 |
| #define | FITC_FILE_NAME | B440M3_PBGTR_SiEn.xml |
| #define | FITC_NM_FILE_NAME | PBGTR_NM |
| #define | NUMBER_OF_SYSTEM_SLOTS | 0 × 6 |

These definitions may be included in header files, e.g., *.h, *.equ, *.inc, as shown at 386, and a binary structure associated with a particular BIOS build may be built using a processor, as shown at 388, and bounded with the BIOS image.

The BIOS descriptor data structure may be inserted into an uncompressed executable in-place ROM area in a Unified Extensible Firmware Interface (UEFI) BIOS, or in a boot block area of legacy BIOS, as shown at 390. Checksum and flash file system requirements (FFS) may be fixed (i.e. configured), so that the feature descriptor 145 will not be rejected, and the server will treat the feature descriptor as part of the main BIOS image. This feature descriptor will not be run as part of the BIOS boot up process, even if the FFS considers the file to be part of the BIOS image.

Once created, the feature descriptor may be flashed (or rewritten) into BIOS ROM memory. Typically, the BIOS is stored in rewritable memory, allowing the contents of the BIOS to be replaced or rewritten. Flashing may be performed by a special program, usually provided by the system's manufacturer, or at POST, with a BIOS image in a hard drive or USB flash drive.

Figure 4:
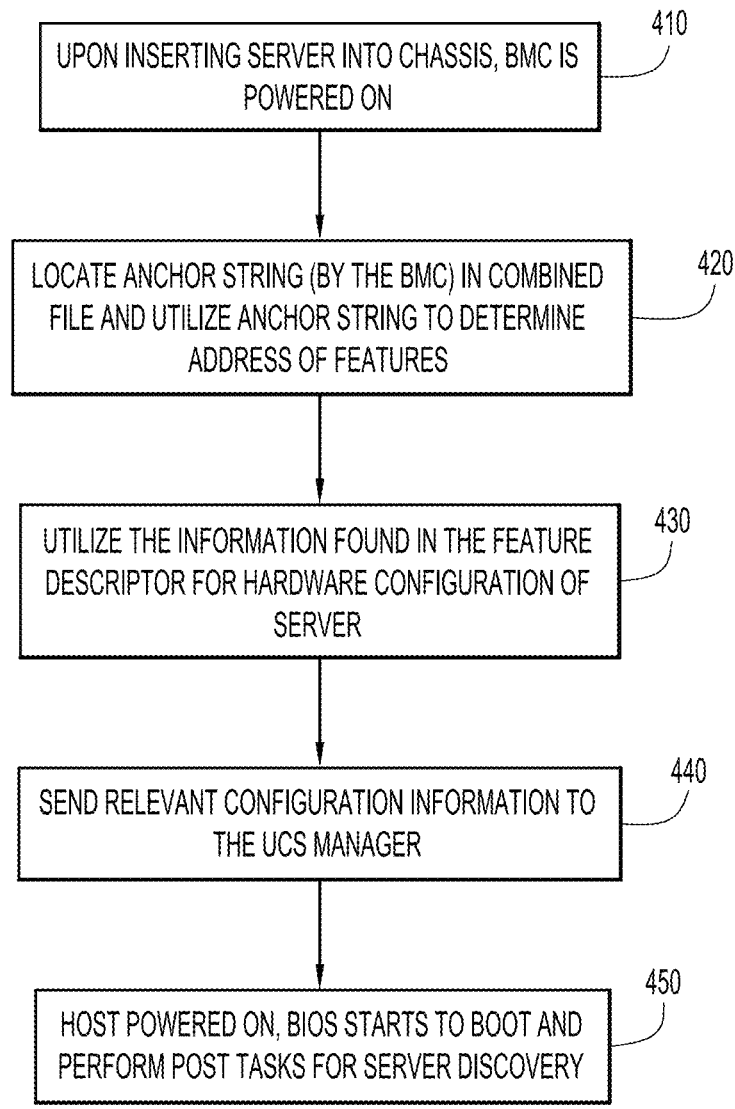
FIG. 4 is a flow chart depicting an example of utilizing a BIOS feature descriptor to preconfigure hardware, according to the techniques disclosed herein.

FIG. 4 shows a flow chart describing operations utilizing a feature descriptor according to the techniques described herein. At operation 410, a server is inserted into a chassis and the BMC is powered on. At operation 420, an anchor string is located (e.g., by the BMC) in the combined image and feature descriptor file, and the anchor string is utilized to determine the address or location of the feature descriptor file, in which the features of the BIOS may be found. Since the BMC knows the ROM BIOS address, the BMC can search for the anchor string and utilize the information therein to locate the feature descriptor.

At 430, information in the feature description is utilized for hardware configuration of the server by passing the information to the UCS Manager 110, and performing host side configurations. Accordingly, before the BIOS even boots up, the feature descriptor can be evaluated to understand what features and capabilities the BIOS has. At operation 440, the relevant configuration information is provided to UCS Manager 110. At operation 450, the host is powered up, the BIOS starts to boot, and POST tasks are performed in order to finish server discovery.

Figure 5:
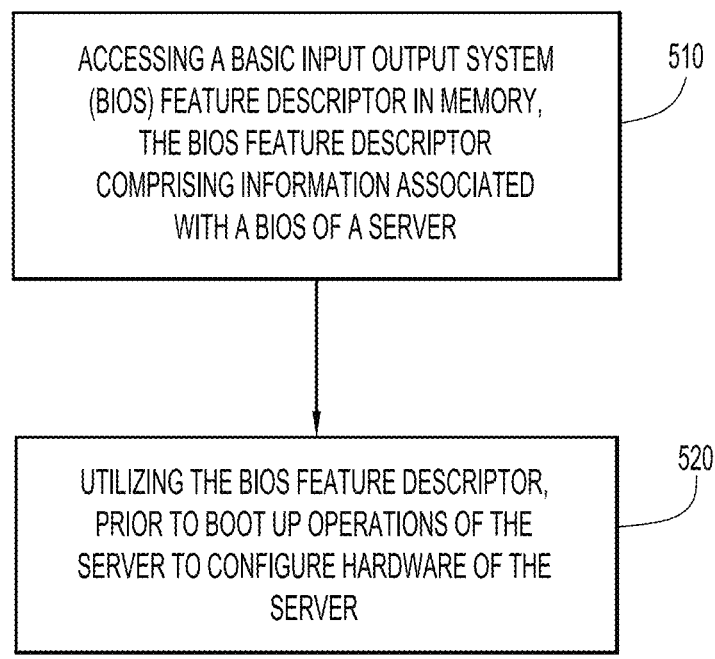
FIG. 5 is another more general flow chart depicting utilizing a BIOS feature descriptor to preconfigure hardware, according to the techniques disclosed herein.

FIG. 5 shows a flow chart generally showing operations of utilizing the BIOS feature descriptor. At operation 510, a Basic Input Output System (BIOS) feature descriptor, stored in memory, is accessed, the BIOS feature descriptor comprising information associated with a BIOS of the server. At operation 520, the BIOS feature descriptor is utilized, prior to boot up operations of the server to configure hardware of the server.

Figure 6:
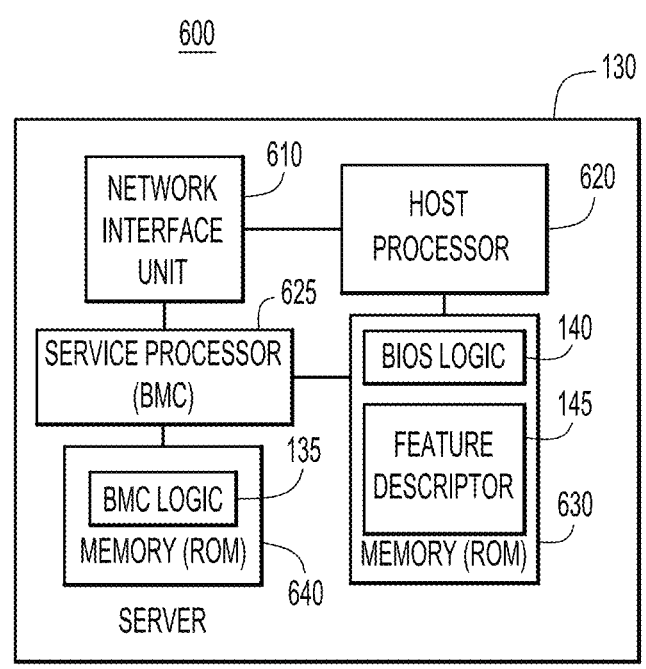
FIG. 6 is a block diagram of a server along with logic for preconfiguring hardware prior to boot up, according to the techniques presented herein.

FIG. 6 illustrates an example block diagram of an apparatus 600 (e.g., a physical device) configured to perform the techniques presented herein. The physical device 600, e.g., a server 130, comprises a network interface unit 610, a host server processor 620, a service processor (BMC) 625, a memory 630, and a memory 640. The network interface unit 610 is configured to enable network communications by interfacing with a network. While conceptually illustrated as a "network interface unit," it will be appreciated that a physical device may contain more than one network interface or type of interface to communicate with other devices within a network. The host processor 620 is one or more microprocessors or microcontrollers and executes BIOS logic 140 associated with the host server. The service processor (BMC) 625 is one or more microprocessors or microcontrollers and executes BMC logic 135 to read information contained within the feature descriptor 145 as well as perform hardware configuration and communicate with the UCS Manager. The memory 630 stores BIOS logic 140 and feature descriptor 145, while memory 640 stores BMC logic 135, which are all configured to effectuate the operations depicted in, e.g., FIGS. 1-5. Accordingly, when a server blade is physically inserted into a chassis, the service processor (BMC) 625, which usually is a less powerful Advanced Reduced Instruction Set Computing (RISC) Machine (ARM) processor that consumes much less power than other processors, will power up and be able to access the host read only memory (ROM) memory 630 to extract information within the feature descriptor 145, relay the information within the feature descriptor 145 to proper parties before the host processors, e.g., more powerful multiple socket/multiple cores/multiple threads processors, boot up with BIOS operations.

Memory 630 and memory 640 may be embodied by one or more computer readable storage media that may comprise ROM, random access memory (RAM), magnetic disk storage media devices, optical storage media devices, flash memory devices, electrical, optical, or other physical/tangible memory storage devices.

Thus, in general, memory 630 may comprise one or more tangible (e.g., non-transitory) computer readable storage media (e.g., a memory device) encoded with software comprising computer executable instructions, and when the software is executed by the host processor 620, the host processor 620 is operable to perform the operations described herein in connection with the BIOS logic 140. In other approaches, such logic may be stored in one or more databases accessible by processor 620.

Further, memory 640 may comprise one or more tangible (e.g., non-transitory) computer readable storage media (e.g., a memory device) encoded with software comprising computer executable instructions, and when the software is executed by the service processor 625, the service processor 625 is operable to perform the operations described herein in connection with BMC logic 135 as well as accessing and retrieving information from feature descriptor 145. In other approaches, such logic may be stored in one or more databases accessible by processor 625.

The functions of the host processor 620 and service processor 625 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

A method is provided comprising: accessing a Basic Input Output System (BIOS) feature descriptor in memory, the BIOS feature descriptor comprising information associated with a BIOS of the server; and utilizing the BIOS feature descriptor, prior to boot up operations of the server to configure hardware of the server.

A method is also provided comprising generating a Basic Input Output System (BIOS) feature descriptor, the BIOS feature descriptor comprising information associated with a BIOS of a server, which is used prior to boot up operations of the server to configure hardware of the server.

An apparatus is provided comprising a network interface unit configured to send and receive communications over a network; and a processor coupled to the network interface unit and a memory and configured to: access a Basic Input Output System (BIOS) feature descriptor in memory, the BIOS feature descriptor comprising information associated with a BIOS of a server; and utilize the BIOS feature descriptor, prior to boot up operations of the server to configure hardware of the server.

An apparatus is also provided comprising a network interface unit configured to send and receive communications over a network; and a processor coupled to the network interface unit and a memory and configured to: generate a Basic Input Output System (BIOS) feature descriptor, the BIOS feature descriptor comprising information associated with a BIOS of a server, which is used prior to boot up operations of the server to configure hardware of the server.

One or more computer-readable storage media are provided encoded with software comprising computer executable instructions and when the software is executed operable to: access a Basic Input Output System (BIOS) feature descriptor in memory, the BIOS feature descriptor comprising information associated with a BIOS of a server; and utilize the BIOS feature descriptor, prior to boot up operations of the server to configure hardware of the server.

Likewise, one or more computer-readable storage media are provided encoded with software comprising computer executable instructions and when the software is executed operable to: generate a Basic Input Output System (BIOS) feature descriptor, the BIOS feature descriptor comprising information associated with a BIOS of a server, which is used prior to boot up operations of the server to configure hardware of the server.

The examples provided herein are not intended to be limiting with regard to the order or inclusion of particular steps with respect to the processes described herein.

The above description is intended by way of example only. Various modifications and structural changes may be made therein without departing from the scope of the concepts described herein and within the scope and range of equivalents of the claims.

What is claimed is:
1. A method comprising:
  accessing a Basic Input Output System (BIOS) feature descriptor in memory, the BIOS feature descriptor comprising information associated with a BIOS of a server; and
  utilizing the BIOS feature descriptor, prior to BIOS boot up completion to notify a server configuration manager of hardware and configuration information of the server in parallel with BIOS boot up,
  wherein accessing the BIOS feature descriptor comprises a baseboard management controller scanning the BIOS feature descriptor,
  wherein an image of the BIOS and the BIOS feature descriptor are stored together as a single combined file, and wherein a flash file system is configured such that the server treats the BIOS feature descriptor as part of the image of the BIOS, but does not run the feature descriptor as part of a BIOS boot up process.

2. The method of claim 1, wherein the BIOS feature descriptor is stored in an ASCII or binary format.

3. The method of claim 1, wherein the BIOS feature descriptor is stored in an uncompressed format.

4. The method of claim 1, wherein accessing comprises accessing the BIOS feature descriptor using an anchor string, the anchor string identifying a region of the memory in which the BIOS feature descriptor is stored or a beginning address in the memory at which the BIOS feature descriptor is stored.

5. The method of claim 1, comprising:
storing in memory, the image of the BIOS and the BIOS feature descriptor, wherein the BIOS feature descriptor comprises a data structure comprising feature and characteristics of the BIOS image.

6. The method of claim 1, comprising selecting information for inclusion with the generated BIOS feature descriptor based upon whether a corresponding variable has been enabled or disabled.

7. The method of claim 1, comprising creating the BIOS feature description in ASCII or binary format.

8. A method comprising:
generating a Basic Input Output System (BIOS) feature descriptor, the BIOS feature descriptor comprising information associated with a BIOS of a server; and
enabling the BIOS feature descriptor to be accessed by a baseboard management controller prior to BIOS boot up completion to notify a server configuration manager of hardware and configuration information of the server in parallel with BIOS boot up,
wherein an image of the BIOS and the BIOS feature descriptor are stored together as a single combined file, and
wherein a flash file system is configured such that the server treats the BIOS feature descriptor as part of the image of the BIOS, but does not run the feature descriptor as part of a BIOS boot up process.

9. An apparatus comprising:
a network interface unit configured to send and receive communications over a network; and
a processor coupled to the network interface unit and a memory and configured to:
access a Basic Input Output System (BIOS) feature descriptor in the memory, the BIOS feature descriptor comprising information associated with a BIOS of a server; and
utilize the BIOS feature descriptor, prior to BIOS boot up completion to notify a server configuration manager of hardware and configuration information of the server in parallel with BIOS boot up,
wherein an image of the BIOS and the BIOS feature descriptor are stored together as a single combined file, and
wherein a flash file system is configured such that the server treats the BIOS feature descriptor as part of the image of the BIOS, but does not run the feature descriptor as part of a BIOS boot up process.

10. The apparatus of claim 9, wherein the BIOS feature descriptor is stored in an ASCII or binary format.

11. The apparatus of claim 9, wherein the BIOS feature descriptor is stored in an uncompressed format.

12. The apparatus of claim 9, wherein the BIOS feature descriptor is stored in memory along with a BIOS image.

13. The apparatus of claim 12, wherein the image of the BIOS along with the data structure comprising features and characteristics of the BIOS is stored in a single file.

14. The apparatus of claim 9, wherein the BIOS feature descriptor is accessed using an anchor string, the anchor string identifying a region of the memory in which the BIOS feature descriptor is stored or a beginning address in the memory at which the BIOS feature descriptor is stored.

15. An apparatus comprising:
a network interface unit configured to send and receive communications over a network; and
a processor coupled to the network interface unit and a memory and configured to:
generate a Basic Input Output System (BIOS) feature descriptor, the BIOS feature descriptor comprising information associated with a BIOS of a server; and
enable the BIOS feature descriptor to be accessed by a baseboard management controller prior to BIOS boot up completion to notify a server configuration manager of hardware and configuration information of the server in parallel with BIOS boot up,
wherein an image of the BIOS and the BIOS feature descriptor are stored together as a single combined file, and
wherein a flash file system is configured such that the server treats the BIOS feature descriptor as part of the image of the BIOS, but does not run the feature descriptor as part of a BIOS boot up process.

16. The apparatus of claim 15, wherein the processor is further configured to select information for inclusion with the generated BIOS feature descriptor file based upon whether a corresponding variable has been enabled or disabled.

17. The apparatus of claim 15, wherein the processor is configured to create the BIOS feature descriptor in ASCII or binary format.

* * * * *